United States Patent [19]

Kitajima et al.

[11] Patent Number: 4,769,674
[45] Date of Patent: Sep. 6, 1988

[54] ORIGINAL FEEDING DEVICE

[75] Inventors: Tadayuki Kitajima, Yokohama; Makoto Kitahara, Tokyo, both of Japan

[73] Assignee: Canon Kabushiki Kaisha, Tokyo, Japan

[21] Appl. No.: 903,287

[22] Filed: Sep. 3, 1986

[30] Foreign Application Priority Data

Sep. 6, 1985 [JP] Japan ................................. 60-198297

[51] Int. Cl.⁴ ............................................ G03G 15/00
[52] U.S. Cl. ............................ 355/14 SH; 355/3 SH; 355/6
[58] Field of Search .................. 355/6, 14 R, 14 SH, 355/3 SH

[56] References Cited

U.S. PATENT DOCUMENTS

| | | | |
|---|---|---|---|
| 4,126,390 | 11/1978 | Connin | 355/6 X |
| 4,157,822 | 6/1979 | Miller | 355/6 X |
| 4,248,528 | 2/1981 | Sahay | 355/6 X |
| 4,419,007 | 12/1983 | Kingsley | 355/14 SH |
| 4,602,776 | 7/1986 | York et al. | 355/6 X |
| 4,609,283 | 9/1986 | Murata et al. | 355/6 X |

FOREIGN PATENT DOCUMENTS 54-121136  9/1979  Japan .

Primary Examiner—R. L. Moses
Attorney, Agent, or Firm—Fitzpatrick, Cella, Harper & Scinto

[57] ABSTRACT

An original feeding device has a supporting device for supporting originals thereon, a partition sheet inserted between a plurality of aggregations of originals supported on the supporting device for the partition of the aggregations of originals, a feed device for feeding the supported originals one by one, a sheet path for directing the originals fed by the feed device to an original processing station, and a device provided in the sheet path to detect the partition sheet fed by the feed device and detect the partition between the aggregations of originals.

13 Claims, 19 Drawing Sheets

ORIGINAL FEEDING DEVICE

BACKGROUND OF THE INVENTION

1. Field of the Invention

This invention relates to an original feeding device provided in a copying apparatus or the like, and more particularly to an original feeding device for feeding originals set on a supporting portion for example, to a predetermined processing station and for receiving the processed originals onto an original receiving tray.

2. Related Background Art

In an original feeding device used in a conventional copying apparatus or the like, a second person could not use the original feeding device until a first person completed the treatment of his or her originals.

In fact, the actual circumstances are such that many people have to wait in a queue until a first person completes the treatment of his or her originals. It is clear that this is very inefficient and time-consuming.

SUMMARY OF THE INVENTION

The present invention is proposed in view of the above-noted disadvantages and an object thereof is to provide an original feeding device in which one or more aggragations of originals are set on an original supporting portion and successive treating operations are continuously and automatically executed in accordance with the treating conditions required of the respective aggregations of originals.

According to the present invention, one or more aggregations of originals are set on an original supporting portion and successive treating operation can be continuously and automatically executed in accordance with the treating conditions required of the respective aggregations of originals and therefore, efficient treatment becomes possible.

Further, the originals are separated one by one from the lowermost original and therefore, even when processing is being executed, an aggregation of originals for another treatment can be added onto the supported originals, and this leads to the possibility of arranging reservations, which in turn leads to further enhanced efficiency.

DESCRIPTION OF THE PREFERRED EMBODIMENT

An embodiment of the present invention will hereinafter be described with reference to the drawings.

FIGS. 1 to 11 show an embodiment of the present invention.

Figure 1:
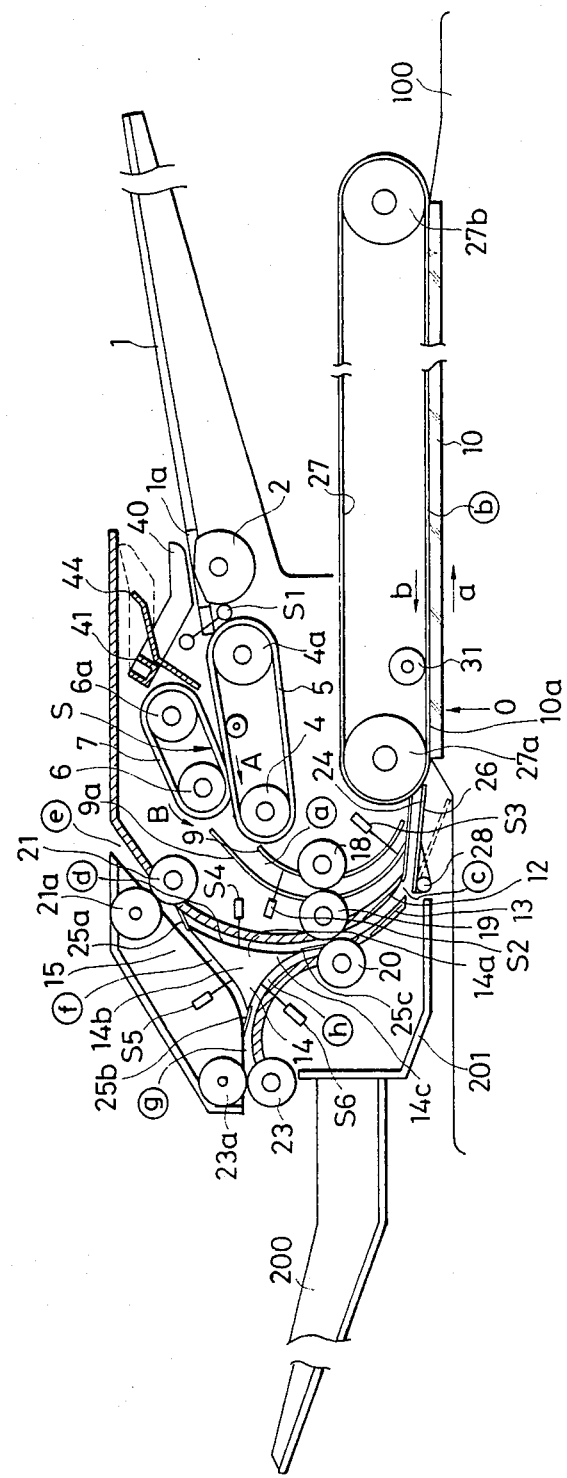
FIG. 1 is a cross-sectional view of an embodiment of the present invention.

FIG. 1 is a cross-sectional view of an original feeding device to which an embodiment of the present invention is applied.

In FIG. 1, reference numeral 1 designates a supporting tray for supporting and setting originals thereon. This tray 1 supports originals thereon and is inclined downwardly toward the original feeding-out direction so that the original feeding-out side is lower. Thus, the originals to be fed are supported en masse in the feeding-out direction.

Reference numeral 2 denotes a semicircular roller for feeding out the originals to a separating station downstream thereof. The semicircular roller 2 is controlled so that it is stopped with its cut-away portion facing upwardly when there is no original on the supporting tray.

Reference characters 4 and 4a designate feed rollers for feeding the originals on the tray 1 by a feed belt 5 being moved round in the direction of arrow A. Reference characters 6 and 6a denote separating rollers for separating the uppermost one of the originals on the tray 1 between a separating belt 7 and the feed belt 5 by the separating belt 7 being moved round in the direction of arrow B. The feed belt 5 and the separating belt 7 together constitute a separating and supplying unit S.

A first sheet path ⓐ is formed between guides 9 and 9a, and it is a path for moving onto platen glass 10 the originals separated one by one in the separating and supplying unit S. The sheet path ⓐ is formed in the shape of an arch between the separating and supplying station S and the end 10a of the platen glass 10, and reverses the original fed out by the feed belt 5 and directs it onto the platen glass 10.

Second sheet paths (ⓒ, ⓓ, ⓔ) are formed between arch-shaped guides 12 and 13, between the guide 12 and one side 14a of a triangular guide 14 and between the guide 12 and a guide 15, and pass outside the first sheet path ⓐ, and they are paths for guiding the originals from the platen glass substantially upwardly.

Third sheet paths (ⓕ, ⓖ) branch off from the second sheet paths in a switch-back direction, and they are paths for guiding the originals from the second sheet paths toward a paper discharge tray 200. Below the extension of the third sheet paths formed by the guide 15 and one side 14b of the triangular guide 14 and by the guide 15 and the guide 13, there is provided the paper discharge tray 200 for receiving the treated originals.

A fourth sheet path ⓗ branches off from the third sheet paths in the switch-back direction, and is formed by the guide 13 and one side 14c of the triangular guide 14, and it is a path for switching back the originals from the third sheet paths and guiding them onto the platen 10.

Reference numerals 18, 19 and 20 designate sheet feeding rollers. Between the rollers 18 and 19, the originals passing through the first sheet path ⓐ is conveyed toward the platen glass 10, and between the rollers 19 and 20, the originals passing through one of the second sheet paths, ⓒ are directed substantially upwardly.

Designated by 21, 21a, 23 and 23a are pairs of feed rollers. The pair of rollers 21 and 21a feed the originals from the platen 10 substantially upwardly, whereafter they are rotated in the reverse direction to switch back the originals from the second sheet paths and feed them to the third sheet paths. The pair of rollers 23 and 23a conveys, in the third sheet paths, the originals toward the paper discharge tray 200, whereafter they are rotated in the reverse direction to feed the originals from the third sheet paths toward the fourth sheet path.

A flexible deflecting plate 24 has its fore end attached to the guide 12 to such a degree that it is in contact with or slightly spaced apart from an original conveying belt 27. The leading end edge of the original passing through the first sheet ⓐ path pushes aside the deflecting plate and travels toward the platen 10. Also, the original travelling from the platen 10 toward the sheet path ⓒ is reliably directed to one of the second sheet paths, ⓒ, because the fore end of the deflecting plate 24 is in contact with or proximate to the belt 27. At this time, a movable deflecting plate 26 is in its dotted-line position and directs the original to one of the second sheet paths, ⓒ.

Reference characters 25a, 25b and 25c denote similar deflecting plates. The deflecting plates 25a, 25b and 25c are attached to guides 14b, 14c and 14a, respectively, and the fore ends thereof are adapted to be in contact with the guides 12, 15 and 13, respectively.

The leading end edges of the originals passing through the sheet paths and ⓓ, ⓕ and ⓗ can push aside these deflecting plates and pass. Also, the originals travelling from the sheet paths ⓔ, ⓖ and ⓒ to the sheet paths and ⓕ, ⓗ and ⓓ respectively, are reliably directed to the sheet paths ⓕ, ⓗ and ⓓ because the fore ends of the deflecting plates 25a, 25b and 25c are pushed by the guides 12, 15 and 13, respectively.

The movable deflecting plate 26 is disposed at the merging portion of the first sheet path ⓐ and one of the second sheet paths, ⓒ, which is adjacent to the left end 10a of the platen glass 10. Also, the movable deflecting plate 26 is disposed parallel to the driving roller 27a of the belt 27 and is pivotable about a shaft 28. The deflecting plate 26 is normally biased upwardly by a spring 29 so that the end portion 26a thereof bears against and is received by the stopper portion 201a of a cover 201 (see FIG. 3B). Also, the movable deflecting plate 26 is pivoted downwardly as indicated by dotted line when a plunger 39 is electrically energized. When in this dotted line position, the movable deflecting plate directs the original from the platen 10 toward the second sheet path ⓒ, and when in the solid line position, the movable deflecting plate directs the original from one of the second sheet paths, ⓒ, toward the platen 10.

These deflecting plates 24, 25a, 25b, 25c and 26 are formed of a flexible sheet such as mylar or stainless steel sheet.

Reference characters 27a and 27b designate original conveying rollers for rotating the original conveying belt 27 provided on the platen 10 substantially over the full width thereof, or conveying the original to eliminate the original on the platen 10 therefrom. Of the original conveying rollers 27a and 27b, the roller 27a is a driving roller and the roller 27b is a follower roller. Denoted by 31 is a belt keeping roller for urging the belt 27 against the upper surface of the platen glass 10 to ensure the conveyance of the originals by the belt 27 and for obtaining clear-cut images.

Designated by S1 is a transmission type first sheet sensor disposed on the fore end side of the original supporting tray 1 for detecting the presence or absence of sheets on the tray 1. S2 denotes a transmission type second sheet sensor disposed in the first sheet path ⓐ between the sheet separating and supplying unit S and the feed rollers 18, 19, S3 designates a third sheet sensor disposed in the first path ⓐ between the feed rollers 18, 19 and the sheet left end 10a of the platen glass 10 S4 denotes a fourth sheet sensor disposed in the second sheet path ⓓ between the left end 10a of the platen glass 10 and the feed rollers 19, 20, S5 designates a fifth sheet sensor disposed in one of the third sheet paths, ⓕ, and S6 denotes a sixth sheet sensor disposed in the fourth sheet path ⓗ between the feed rollers 23, 23a and the left end 10a of the platen glass 10. The second to sixth sheet sensors S2–S6 detect the leading end edge or the trailing end edge of the sheets passing by these sensors. The second sheet sensor S2 serves also to read the mode setting by partition paper which will be described later.

Reference numeral 40 designates a weight member disposed above the through-hole 1a of the original supporting tray 1 and pivotable about a shaft 41. This weight member 40 is normally biased upwardly to an escape position by a spring 42 (FIG. 4) as indicated by dotted-and-dashed line in FIGS. 1 and 4, and is downwardly pivoted against the force of the spring 42 by an electromagnetic device 43 being electrically energized and comes into contact with that portion of the upper surface of the supported sheet which corresponds to the position of the semicircular roller 2, thus moderately pressing that portion of the sheet and applying a load thereto. By the loading action of the weight member 40 upon the supported sheet P, the feeding of the lowermost one of the supported sheets on the tray 1 toward the mechanism S by the semicircular roller is made stable and reliable.

Figure 5:
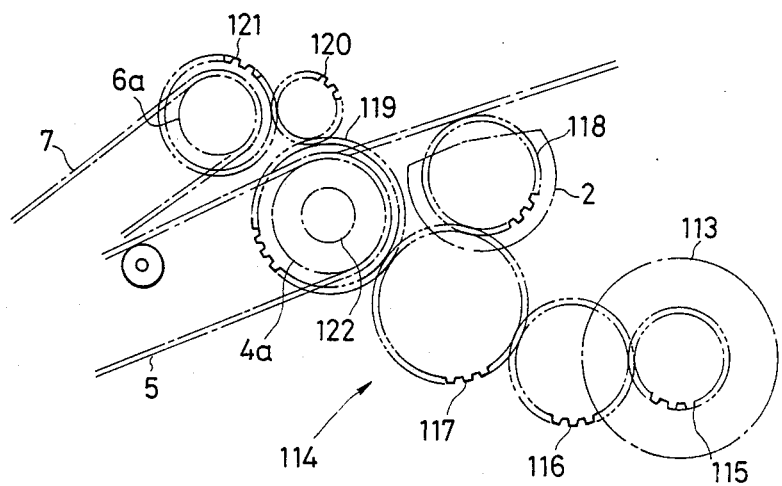
FIG. 5 is a detailed view of a separating portion driving system.

Reference is now had to FIG. 5 to describe the driving of the separating and supplying unit S.

FIG. 5 shows the driving system of the separating means S, etc., comprising a gear train 114 constructed as follows. A gear 115 fixed to the shaft of a drive motor 113 is connected to a gear 117 through an intermediate gear 116. The gear 117 is in mesh engagement with a gear 118 fixed to the shaft of the semicircular roller 2 and a gear 119 for driving the driving pulley 4a of the feed belt 5. The gear 119 is connected to a gear 121 fixed to the shaft of the driving pulley 6a of the separating belt 7 through an intermediate gear 120.

A conventional one-way clutch 122 is provided between the gear 119 and the driving pulley 4a of the feed belt 5 so as to permit reverse feeding in a forward (counter-clockwise) direction.

The hole surface belt driving unit and a feed roller driving unit will now be described with reference to FIGS. 6 and 7.

Figure 6:
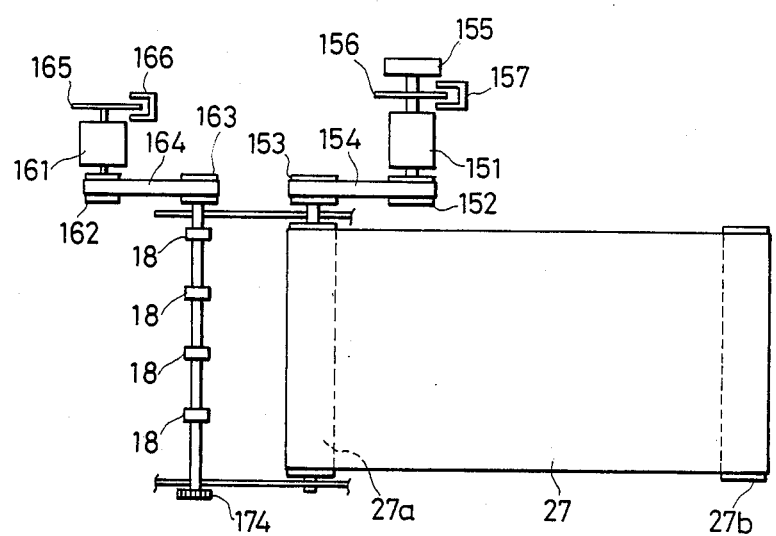
FIG. 6 is a plan view of a conveyor driving system.

FIG. 6 is a top plan view of the main driving unit. In FIG. 6, reference numeral 151 designates a whole surface belt conveying motor which is rotatable in forward and reverse directions. Reference numeral 152 denotes a motor pulley mounted on the shaft of the motor 151. On the other hand, a driving pulley 153 is mounted on the shaft of an original conveying drive roller 27a and a timing belt 154 is passed over and between the motor pulley 152 and the driving pulley 153. Also, an electromagnetic brake 155 is mounted on the main shaft of the motor 151 to improve the accuracy with which the original is stopped. Further, a clock disk 156 and as photointerrupter 157 are mounted on the inner part of the main shaft to detect the revolution of the motor.

Reference numeral 161 designates a feed roller driving motor which is revolvable in forward and reverse directions. Reference numeral 162 denotes a motor pulley mounted on the motor 161. On the other hand, a pulley 163 is mounted on the main shaft of the feed roller 18, and a timing belt 164 is passed over and between the motor pulley 162 and the pulley 163. Also, a clock dish 165 and a photointerrupter 166 are mounted on the inner part of the main shaft to detect the revolution of the motor.

Figure 7:
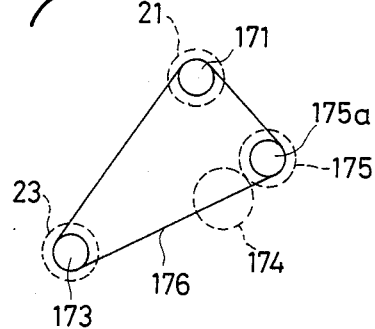
FIG. 7 is a front view of the conveyor driving system.

FIG. 7 is a front view of the main driving unit.

In FIG. 7, pulleys 171 and 173 are mounted on this side of the respective main shafts of feed rollers 21 and 23, and a gear 174 is on this side of feed roller 18. A gear 175 which is in mesh engagement with the gear 174 has a pulley portion 175a on this side thereof. A timing belt 176 is passed over the pulleys 171, 173 and 175a. Thereby, the revolution of the feed roller driving motor 161 is transmitted to the feed rollers 18, 21 and 23. Also, the feed roller 19 is urged against the roller 18 and the roller 20 is urged against the roller 19 and thus follows the rotation of the latter.

Figure 2:
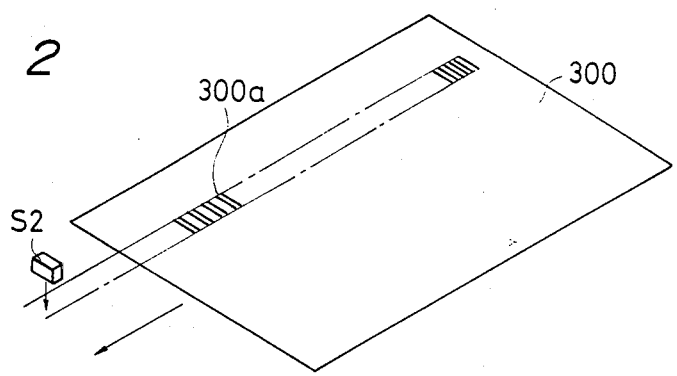
FIG. 2 is a detailed view of a partition paper sheet.
Figure 3A:
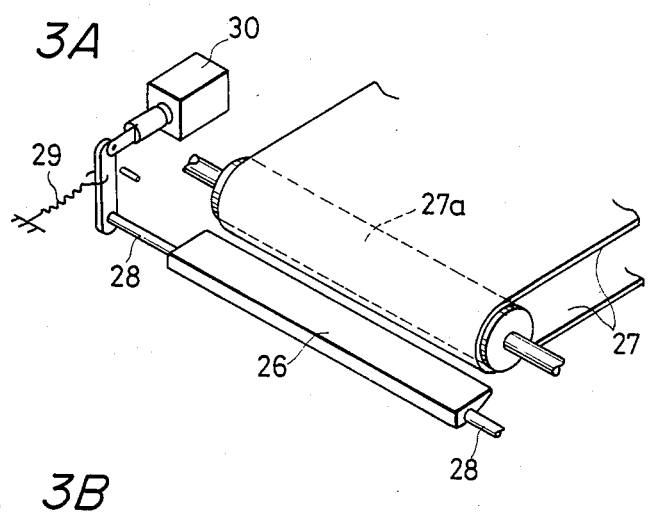
FIGS. 3A and 3B are detailed views of a deflecting guide portion.
Figure 3B:
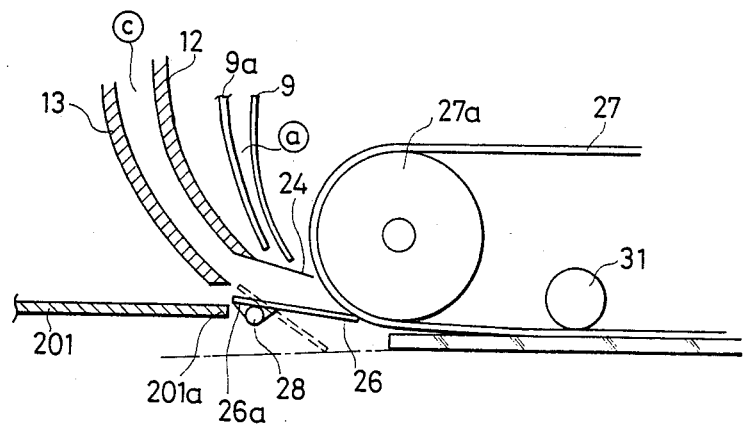
Figure 4:
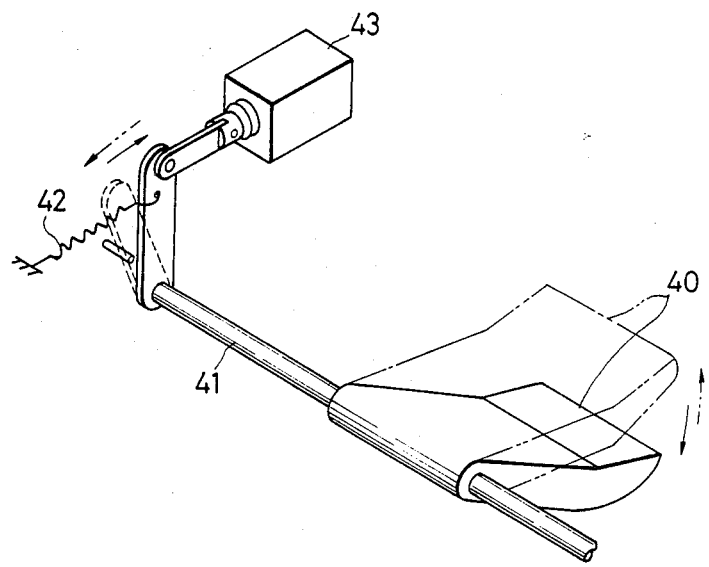
FIG. 4 is a detailed view of a weight portion.

On the other hand, in FIG. 2, reference numeral 300 designates partition paper. On the partition paper 300, a number of rectangles 300a are depicted in a row in the original feeding direction so that marking for mode setting can be made, and by blackening (marking) them, mode setting may be accomplished.

The mode refers to the selection of the type of the original (one side or both sides, i.e. having an image on both surfaces thereof), the copying magnification, the number of copies, and whether both-side copying or one-side copying is required. The widthwise position of the rectangles 300a corresponds to the sensor S2.

The operation of the invention will now be described.

Figure 8:
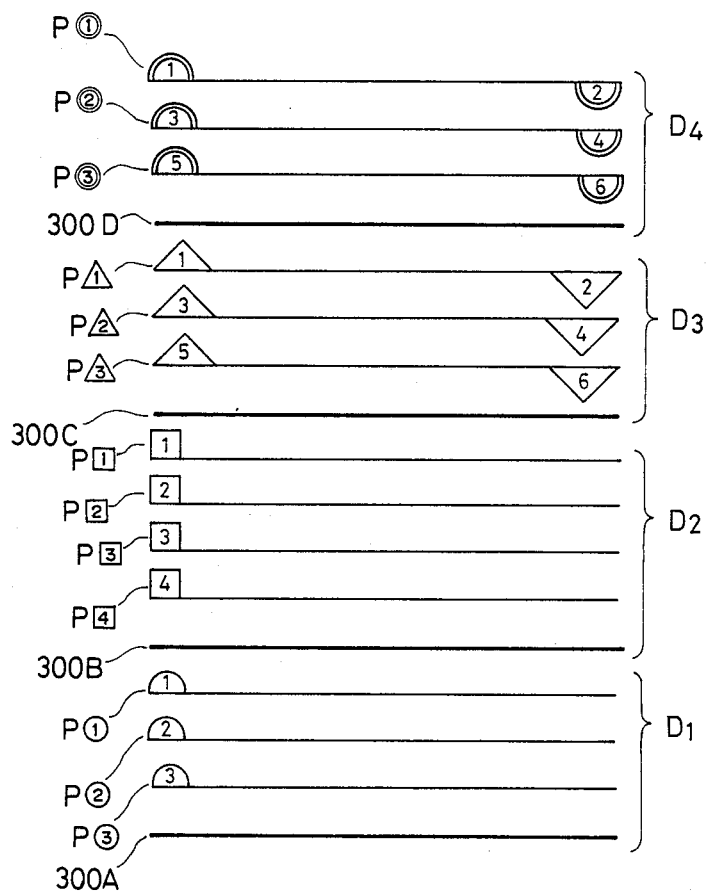
FIG. 8 is a detailed view of aggregations of originals.

Specifically, description will be made with respect to cases where one-side or both-side copies are to be obtained for a set of three one-side originals D1 comprising pages ①-③, a set of four one-side originals D2 comprising pages ①-④, and two sets of each three both-side originals D3, D4 comprising pages ①-⑥, as shown in FIG. 8. Under the lowermost parts of the respective aggregations of originals, there are disposed partition paper sheets 300A-300D for setting the modes of the respective aggregations of originals. At this time, the surface to be subjected to parking faces upwardly. An aggregation of originals refers to a lump comprised of originals which require the same treatment condition.

In this manner, the one-side originals are superposed one upon another in the order of pages from above with the image bearing surfaces facing upward, while the both-side originals are superposed one upon another in the order of pages with page ① facing upward. Under the lowermost parts of the respective aggregations of originals D1-D4, partition paper sheets 300 for setting the treatment modes of the respective aggregations of originals thereon are disposed with their making surfaces facing upward, and these aggregations of originals are placed onto the original supporting tray 1. At that time, the aggregations of originals are inserted sufficiently between the tray 1 and the raised weight member 40 and set with the leading end edge of the bundle of originals bearing against the front face of a control plate 44 (FIG. 9(1)).

A. Treatment of Aggregation of One-Side Originals D1

(i) After the originals have been set, the copy start button on the unshown operating panel of the copying apparatus body 100 is depressed.

(ii) The electromagnetic device 43 (FIG. 4) is electrically energized by the copy start signal and the weight member 40 is lowered to hold down the supported sheet originals.

(iii) Then, the driving of the semicircular roller 2 and the sheet separating and conveying mechanism S is started and the lowermost sheet on the supporting tray 1, i.e., the partition paper sheet 300A (FIG. 8) of the aggregation of originals D1 is separated and comes into the first sheet path ⓐ.

(iv) The partition paper sheet 300A having come into the first sheet path ⓐ has the passage of its leading end edge detected by the second sheet sensor S2, and then strikes against and is stopped by the nip between the pair of feed rollers 18 and 19 which are stopped from rotating at that point of time. The feed rollers 18 and 19 are driven for rotation in the forward direction after the lapse of a predetermined timer time T1 from the point of time at which the leading end edge of the sheet has been detected by the second sheet sensor S2. A predetermined amount of loop is formed in the partition paper sheet between the sheet separating and conveying mechanism S and the pair of rollers 18, 19 before the timer time elapses.

(v) When the driving of the pair of feed rollers 18 and 19 for rotation in the forward direction is started, the driving of the semicircular roller 2 and the sheet separating and conveying mechanism S is stopped. Also, the electromagnetic device 43 is electrically deenergized and the weight member D40 is raised and held in a state in which it has escaped from the upper surface of the supported sheet originals on the tray 1. Even when the roller 2 and the mechanism S are stopped, the partition paper sheet 300A is continuously conveyed through the first sheet path ⓐ by the forward rotation of the pair of feed rollers 18 and 19.

(vi) When the leading end edge of the partition paper sheet 300A is then detected by the third sheet sensor S3, the driving of the whole surface belt 27 for rotation in the forward direction is started by the detection signal. The leading end edge of the partition paper sheet 300A pushes aside the deflecting plate 24 and arrives at the left end of the platen glass 10, and subsequently passes through the gap between the whole surface belt 27 and the fore end edge of the movable deflecting plate 26 changed over to the solid line position, and comes between the underside of the whole surface belt 27 being rotated in the forward direction and the platen glass 10 with the image bearing surface thereof facing downward, and the partition paper sheet is conveyed along the surface of the platen glass 10 toward the right side thereof by the conveying force of the whole surface belt 27.

(vii) In the first sheet path ⓐ, the marking on the partition paper sheet 300A is read by the second sheet sensor S2 during the conveyance of the partition paper sheet, whereby the following treatment mode is determined. Since the second sheet sensor S2 and the marking are coincident with each other in the widthwise direction of the originals, the marking can be read while the sheet is conveyed.

(viii) At a point in time at which a predetermined clock (whole surface belt) CL1 has elapsed after the passage of the trailing end edge of the partition paper sheet 300A has been detected by the third sheet sensor S3, the driving of the whole surface belt 27 is stopped. At the point in time at which this stoppage takes place, the trailing end edge of the partition paper sheet 300A conveyed onto the platen glass arrives at a predetermined base line position 0 (FIG. 1). The driving of the pair of feed rollers 18 and 19 for rotation in the forward direction is stopped at a point in time at which a predetermined timer time T3 has elapsed after the passage of the trailing end edge of the partition paper sheet 300A has been detected by the second sheet sensor S2. Within this timer time T3, the trailing end edge of the partition paper sheet completely passes between the pair of feed rollers 18 and 19 (FIG. 9(2)).

(ix) After the partition paper sheet 300A has been fed onto the platen glass 10, reverse rotation of the whole surface belt 27 is effected. At this, time, the movable deflecting plate 26 is held in its dotted-and-dashed line position.

(x) By the reverse rotation of the whole surface belt 27, the partition paper sheet 300A is conveyed in the reversed direction and passes over the upper surface of the movable deflecting plate 26 into the second sheet path. Then, the partition paper sheet passes through the route of the path ⓒ → the pair of feed rollers 19 and 20 (rotating in the forward direction)→the path ⓓ → the pair of feed rollers 21 and 21a (rotating in the forward direction)→the path ⓔ.

(xi) At a point in time at which a predetermined timer time T4 has elapsed, after the passage of the trailing end edge of the partition paper sheet 300A has been detected by the fourth sheet sensor S4, the pair of feed rollers 21 and 21a are changed over to the reverse rotation. Before this timer time T4 is up, the trailing end edge of the partition paper sheet 300A passes through the deflecting guide 25a and arrives at this side of the pair of rollers 21 and 21a (FIG. 9(3)).

(xii) By this reverse rotation of the pair of rollers 21 and 21a, the partition paper sheet 300A in the second sheet path ⓔ is switch-back-conveyed into the third sheet path ⓕ, and then comes into the third sheet path ⓖ in which the pair of feed rollers 23 and 23a are rotating in the forward direction.

(xiii) At a point in time at which a predetermined timer time T5' has elapsed, after the passage of the trailing end edge of the partition paper sheet 300A has been detected by the fifth sheet sensor S5, the forward rotation of the pair of feed rollers 23 and 23a is stopped. Before this timer time T5' is up, the trailing end edge of the partition paper sheet 300A completely passes between the pair of rollers 23 and 23a and the partition paper sheet is discharged onto the paper discharge tray 200 with its marking surface facing upward (FIG. 9(4)).

(xiv) When the discharge of the partition paper sheet 300A is terminated (the time T5' is up), treatment of the aggregation of originals D1 is started.

Figure 9:
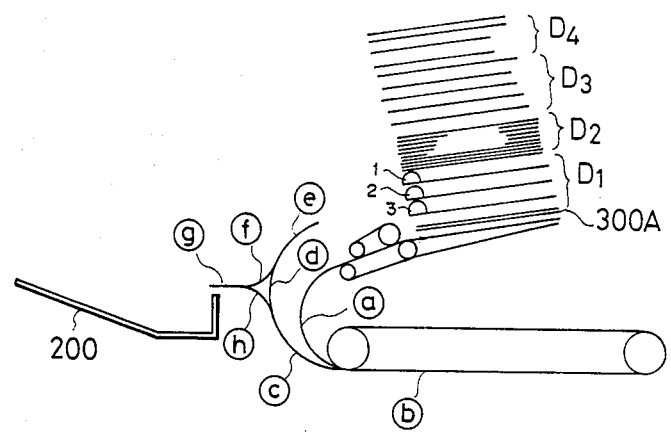
FIGS. 9(1) to 9(33) illustrate the operation of the present invention.
Figure 9:
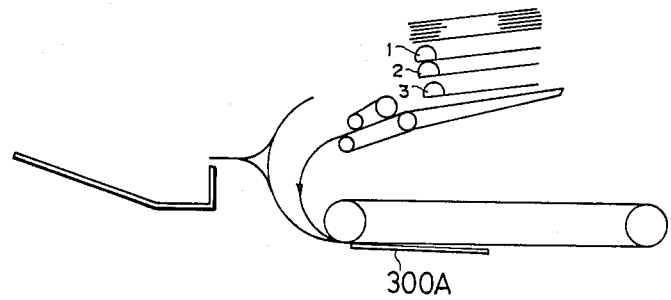
Figure 9:
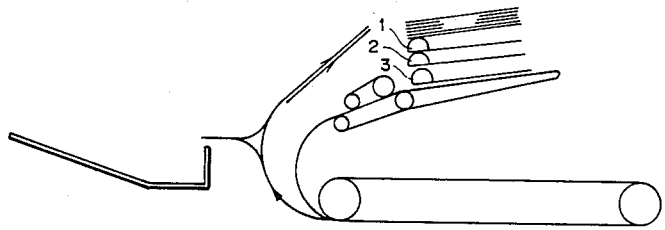
Figure 9:
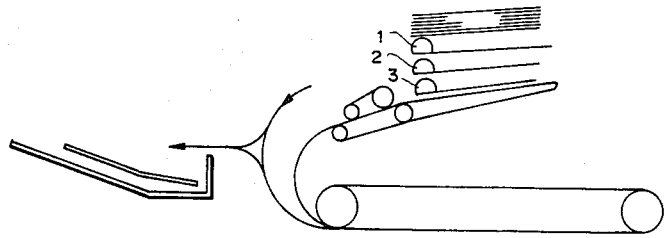
Figure 9:
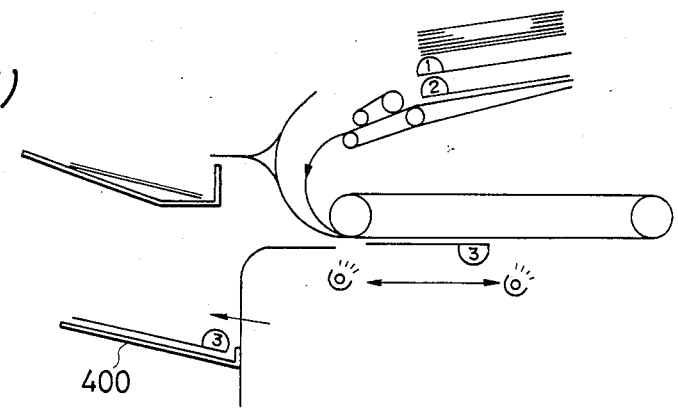
Figure 9:
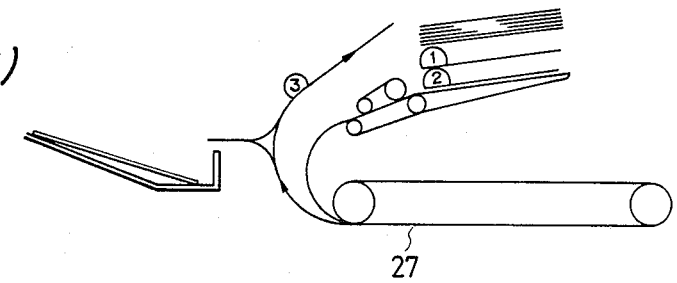
Figure 9:
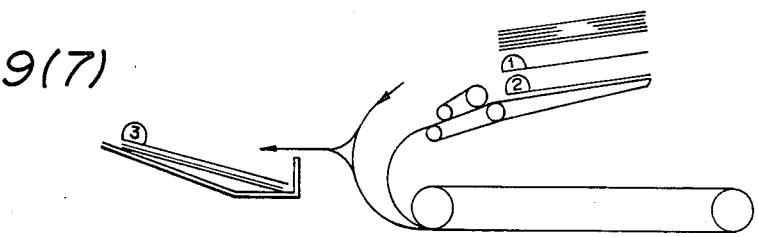
Figure 9:
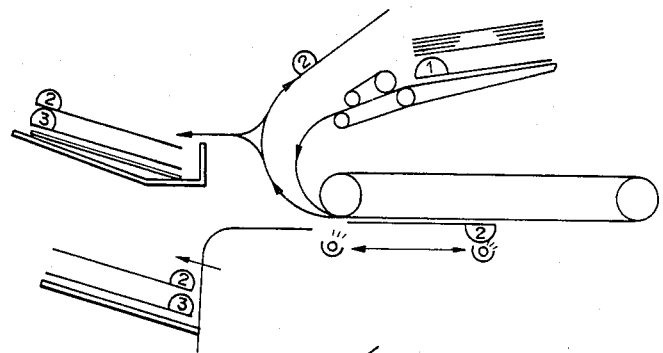
Figure 9:
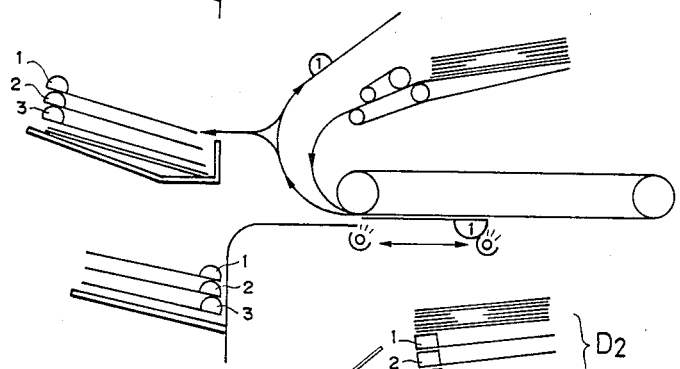
Figure 9:
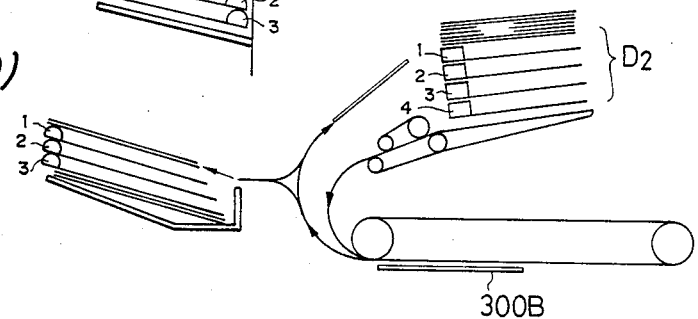
Figure 9:
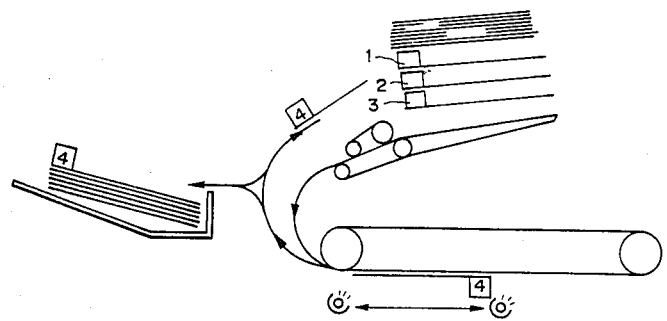
Figure 9:
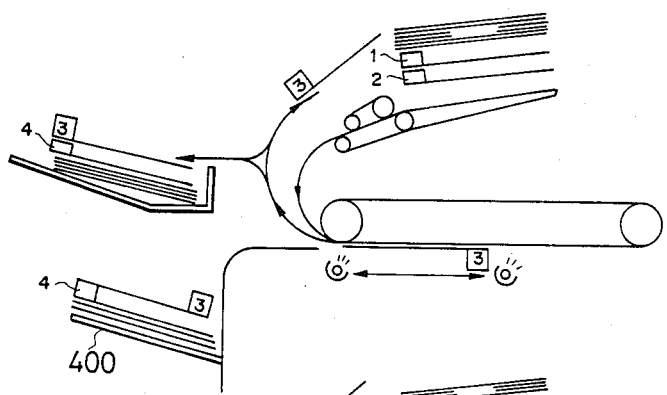
Figure 9:
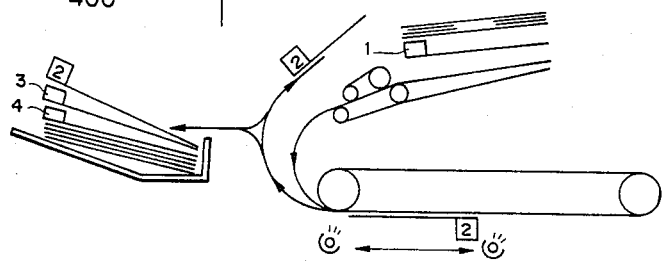
Figure 9:
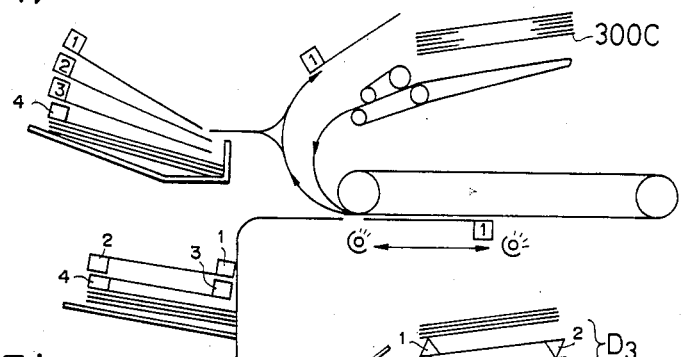
Figure 9:
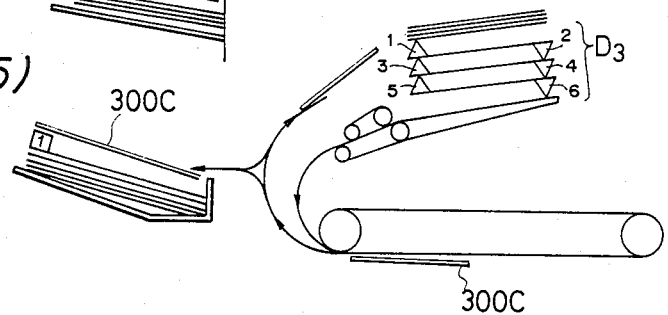
Figure 9:
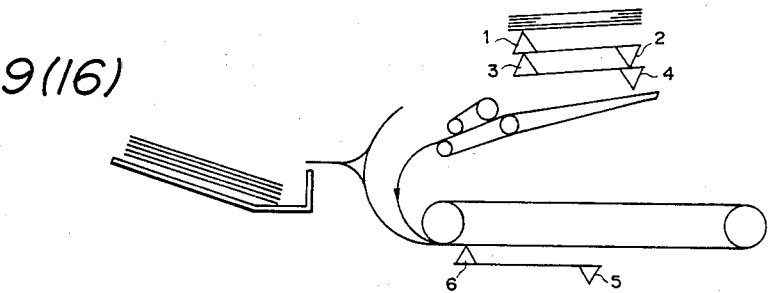
Figure 9:
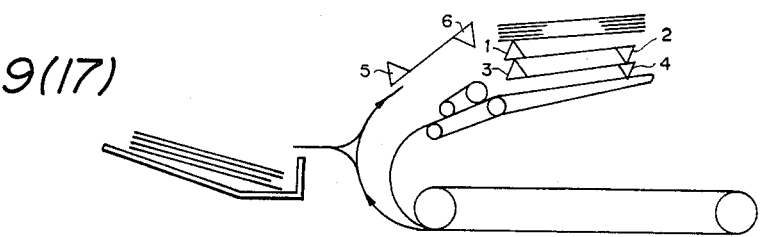
Figure 9:
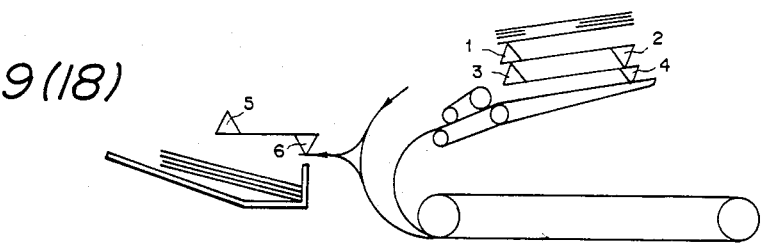
Figure 9:
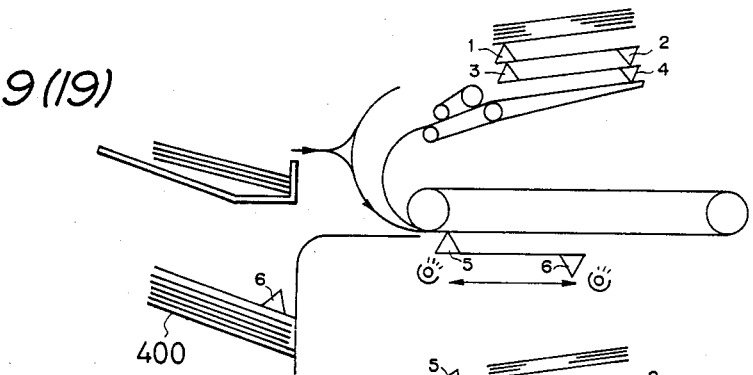
Figure 9:
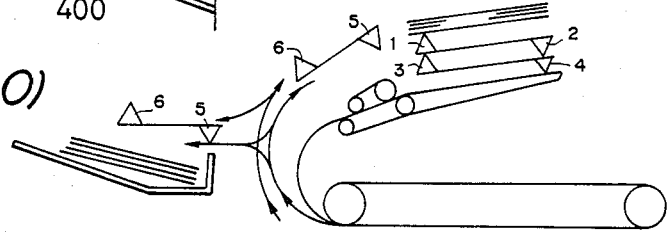
Figure 9:
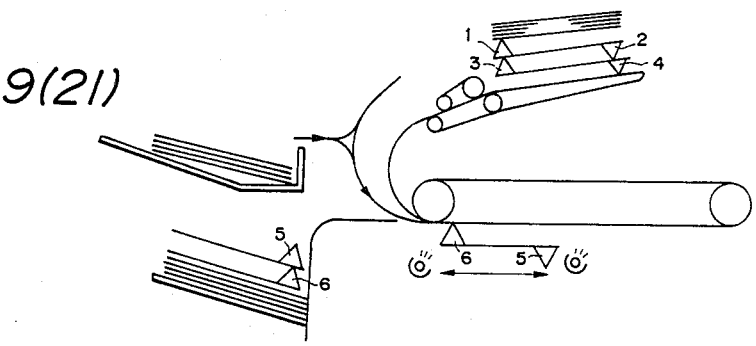
Figure 9:
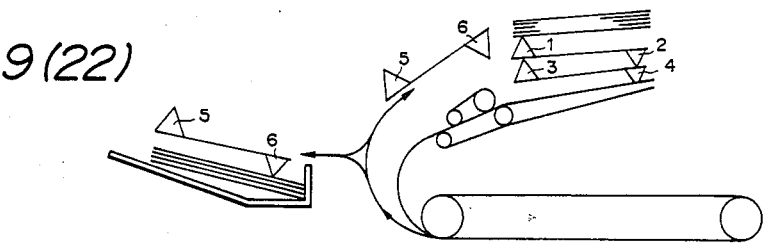
Figure 9:
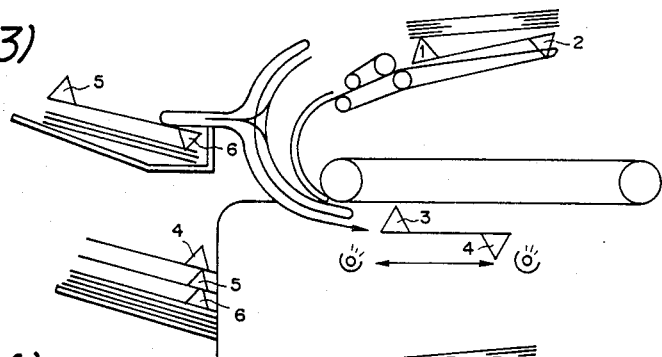
Figure 9:
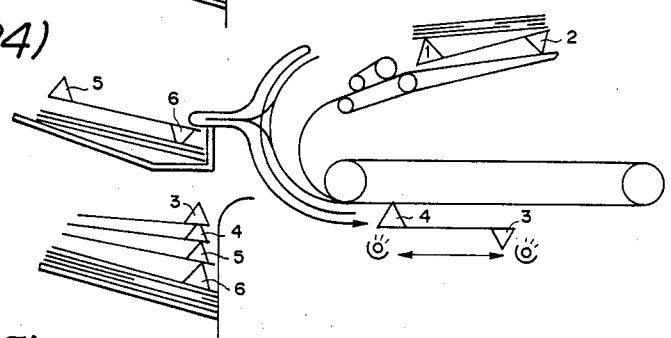
Figure 9:
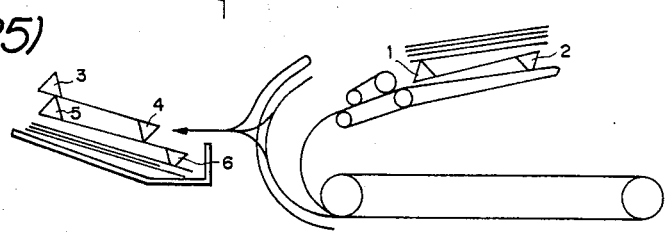
Figure 9:
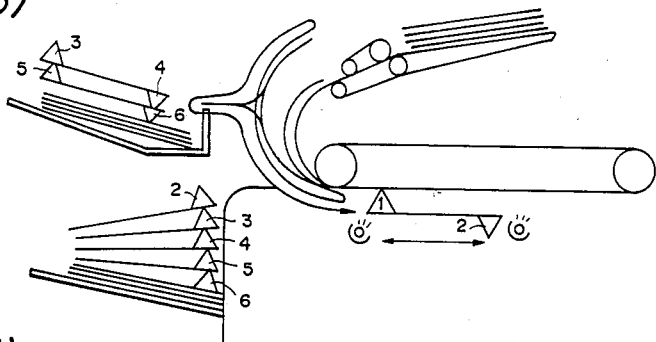
Figure 9:
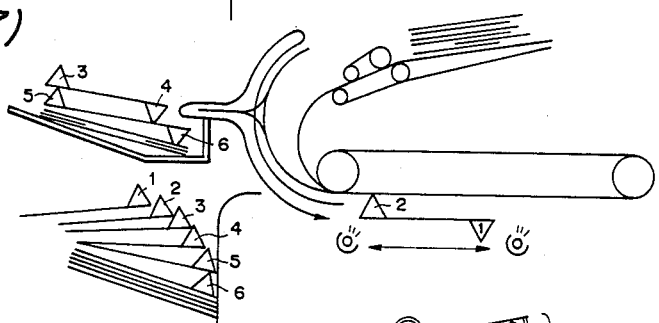
Figure 9:
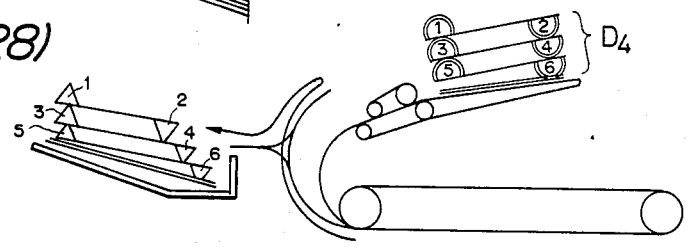
Figure 9:
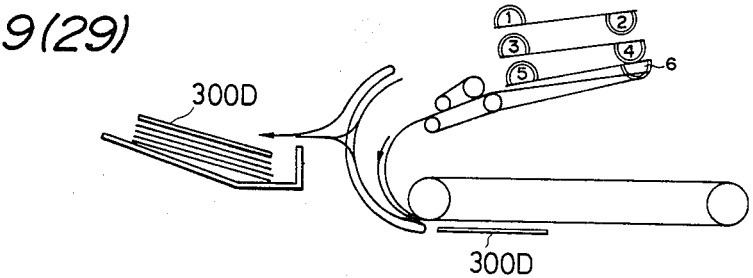
Figure 9:
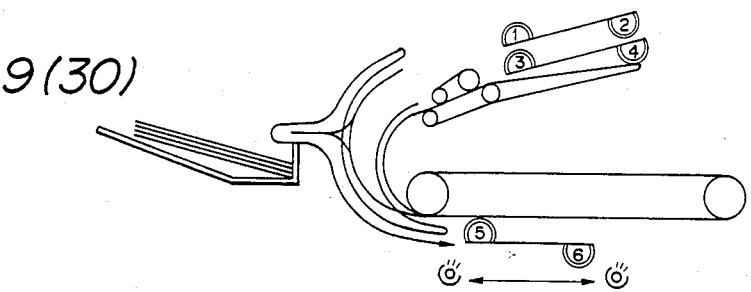
Figure 9:
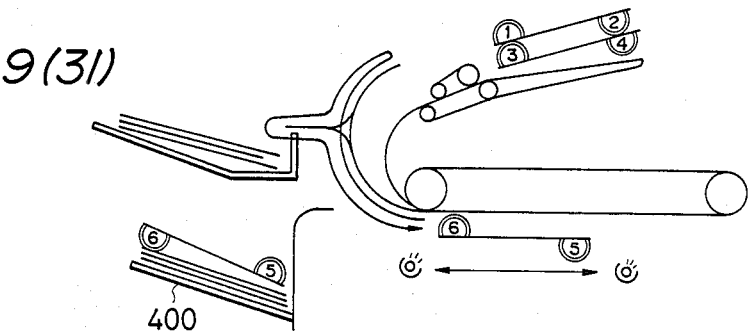
Figure 9:
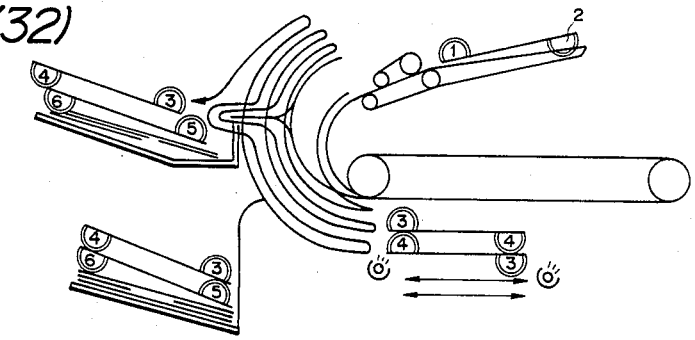
Figure 9:
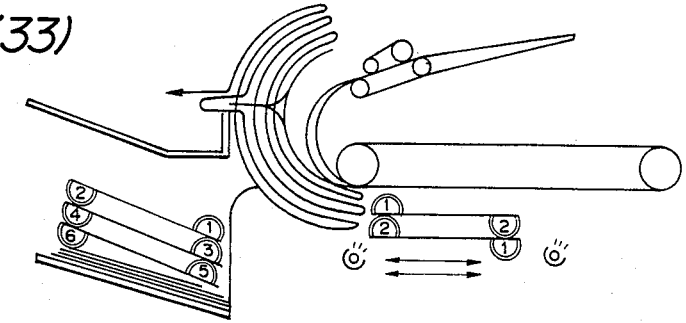
Figure 10:
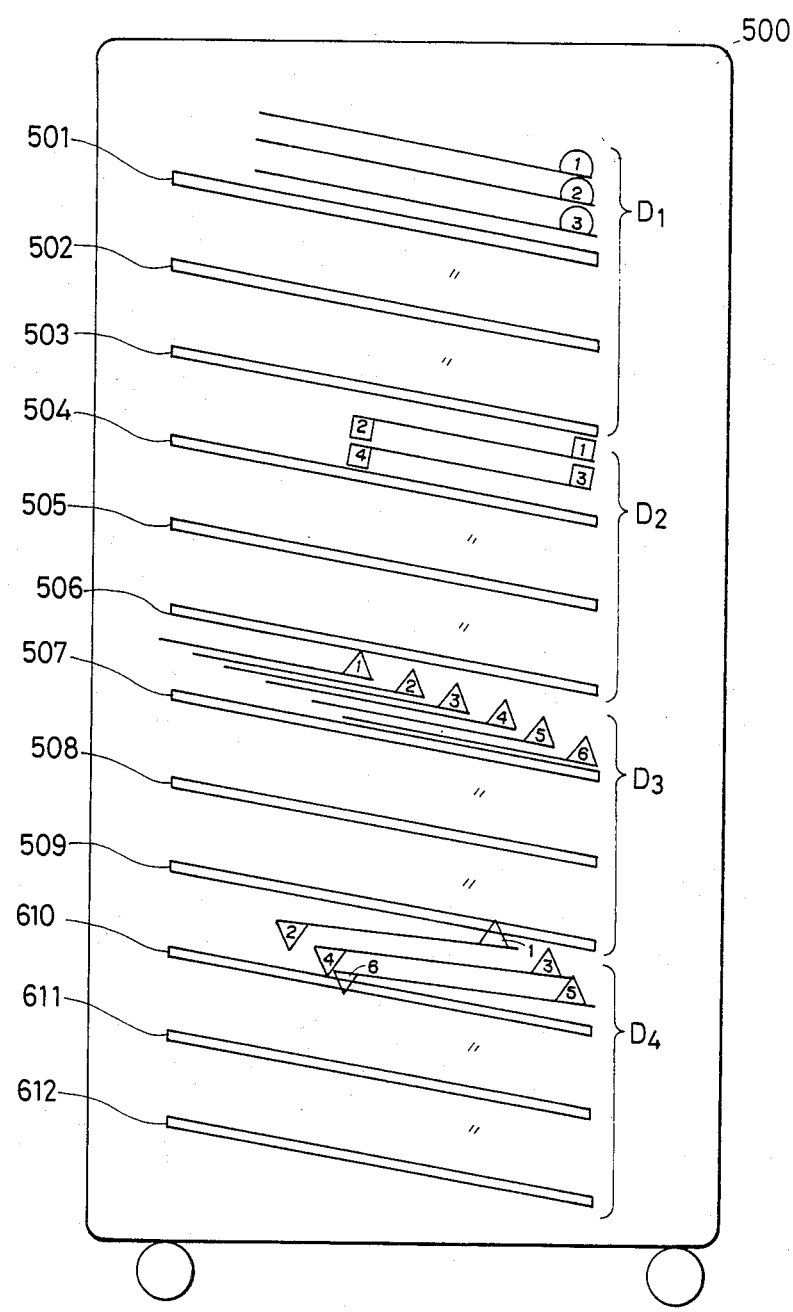
FIG. 10 illustrates a sorter.

Thereafter, the operations of paragraphs A-ii to A-viii are effected in a similar manner and the lowermost original P ③ of the aggregation D1 is set on the platen with the image bearing surface thereof facing downward (FIG. 9(5)).

(xv) Subsequently, the optical system on the copying apparatus body 100 side is operated on the basis of the stop signal of the whole surface belt 27 and an exposure copying process is executed for the original P ③ set on the platen glass 10. The copying mode in this case is determined by the symbol marked on the partition paper sheet 300A as previously described, and copying is executed in accordance with that mode.

In this case, the treatment of the aggregation of originals D1 is one-side original→one-side copying. In the case of one-side→one-side mode, the image of the original P ③ is formed on a first surface of a copy sheet, and the copy sheet is discharged onto the copy tray 400 with the image bearing surface thereof facing upward (FIG. 9(5)).

(xvi) The copying process (xv) is repeated a number of times corresponding to a desired number of sheets. The designation of this number of sheets is also based on the information from the partition paper sheet 300A.

(xvii) Subsequently, the whole surface belt 27 is changed over to the reverse rotation on the basis of the exposure process completion signal of the copying apparatus 100 for the original P ③ (FIG. 9(6)).

(xviii) Thereafter, by the operations of paragraphs A-ix to A-xiii, the original P ③ is discharged with the image bearing surface thereof facing upward (FIG. 9(7)).

(xix) Thereafter, the operations of paragraphs A-xiv to A-xviii are effected for the originals P ② and P ①, whereupon the treatment of the aggregation of originals D1 is completed (FIGS. 9(8) and 9(9)).

B. Treatment of Aggregation of One-Side Originals D2

(i) When the discharge of the last original P ① of the aggregation D1 is completed, the operations of paragraphs A-ii to A- Viii are effected and the partition paper sheet 300B is set on the platen. At this time, the copying operation is not effected because the set partition paper sheet is not an original. Then the mode so far set by the partition paper sheet 300A is reset, whereupon a new mode by the partition paper sheet 300B is set and thereafter, the treatment to the originals is effected in this mode (FIG. 9(10)).

(ii) The operations of paragraphs A-ix to A-viii are effected for the partition paper sheet 300B as for the partition paper sheet 300A, and the partition paper sheet 300B is discharged.

(iii) When the discharge of the partition paper sheet 300B is completed, treatment of the aggregation of originals D2 is started. The operations of paragraphs A-ii to A-viii are effected, and the lowermost original P ④ of the aggregation D2 is set on the platen with the image bearing surface thereof facing downward (FIG. 9(11)).

(iv) Subsequently, the optical system on the copying apparatus body 100 side is operated on the basis of the stop signal of the whole surface belt 7, and the exposure and copying process is executed for the original P ④ set on the platen glass 10. The copying mode in this case is determined by the symbol marked on the partition paper sheet 300B as previously described, and copying is executed in accordance with this mode.

In this case, the treatment of the aggregation of originals D2 is one-side original→both-side copying. In the case of the one-side→both-side mode, the image of the original P ④ is formed on a first surface of a copy sheet, and the copy sheet is temporarily fed to the re-conveying mechanism (intermediate tray 402, etc.) in the copying apparatus.

(v) The copying process of paragraph B-iv is repeated a number of times corresponding to the desired number of sheets. The designation of this number of sheets is also based on the information from the partition paper sheet 300B.

(vi) Then, the whole surface belt 27 is changed over to the reverse rotation on the basis of the exposure process completion signal of the copying apparatus 100 side for the original P ④.

(vii) Thereafter, by the operations of paragraphs A-ix to A-xiii, the original P ④ is discharged with the image bearing surface thereof facing upward (FIG. 9(11)).

(viii) The next original P ③ is set on the platen by the operations of paragraphs A-ii to A-viii (FIG. 9(12)).

(ix) When the driving of the whole surface belt 27 for rotation in the forward direction is stopped, the optical system on the copying apparatus 100 side is operated on the basis of the signal, and the exposure and copying process is executed for the third page, i.e., the original P ③ set on the platen glass 10 with the image bearing surface thereof facing downward.

A copy sheet on the first surface of which the image of the fourth page has already been formed. is fed from the re-conveying mechanism, and the image of the third page is formed on the second surface of the copy sheet, whereby a both-side copy is formed, and the both-side copy is discharged onto the copy tray with the third page surface thereof facing upward (FIG. 9(12)).

(x) Thereafter, the operations of paragraphs B-iii to B-vii are effected for the original P ② and the operations of paragraphs B-viii to B-ix are effected for the original P ①, whereby treatment of the aggregation of originals D2 is completed (FIGS. 9(13) and 9(14)).

C. Treatment of Aggregation of Both-Side Originals D3

(i) When the discharge of the last original P ① of the aggregation D2 is completed, the operations of paragraphs A-ii to A-viii are effected and the partition paper sheet 300C is set on the platen. At this time, the copying operation is not effected because the set partition paper sheet is not an original. Then, the mode so far set by the partition paper sheet 300B is reset, whereupon a new mode by the partition paper sheet 300C is set and the following treatment to the originals is effected in this mode (FIG. 9(15)).

(ii) The operations of paragraphs A-ix to A-xiii are effected for the partition paper sheet 300C as for the partition paper sheets 300A and 300B, and the partition paper sheet 300C is discharged (FIG. 9(15)).

(iii) When the discharge of the partition paper sheet 300C is completed, treatment of the aggregation of originals D3 is started. By the operations of paragraphs A-ii to A-viii, the lowermost original P ④ of the aggregation D3 is set on the platen with the fifth page facing downward (FIG. 9(16)).

(iv) By the operations of paragraphs A-ix to A-xii, the original P/3\ comes into the third sheet path ⓖ (FIG. 9(17)).

(v) At a point in time at which a predetermined time T5 has elapsed after the passage of the trailing $ end edge of the original /3\ has been detected by the fifth sheet sensor S5, the pair of feed rollers 23 and 23A are changed over to the reverse rotation. Before this timer time T5 is up, the trailing end edge of the original P/3\ passes through the deflecting guide 25b and arrives at this side of the pair of rollers 23 and 23a (FIG. 9(18)).

(vi) By said reverse rotation of the pair of rollers 23 and 23a, the original P/3\ is switch-back-conveyed and comes into the fourth sheet path h. At this time, the movable deflecting plate 26 is changed over to its solid line position, and the original P/3\ passes over the upper surface thereof toward the left side of the platen glass 10 (FIG. 9(19)).

(vii) When the passage of the leading end edge of the original P/3\ having come into the fourth sheet path h is detected by the sixth sheet sensor S6, forward rotation of the whole surface belt 27 is started and the original P/3\ passes over the upper surface of the movable deflecting plate 26 and through the gap between the fore end edge of the movable deflecting plate 26 and the whole surface belt and comes between the platen glass 10 and the whole surface belt 27 rotating in the forward direction, and is conveyed toward the left side of the platen glass 10 by the conveying force of the belt 27.

(viii) At a point in time at which a predetermined clock CL2 has elapsed after the passage of the trailing end edge of the original P/3\ has been detected by the sixth sheet sensor S6, the forward rotation of the whole surface belt 27 is stopped. At the point in time at which this stoppage takes place, the trailing end edge of the original P/3\ conveyed onto the platen glass 10 arrives at a predetermined base line position O.

(iv) Then the original P/3\ is set on the platen glass 10 with the sixth page facing downward (FIG. 9(19)).

(x) Subsequently, the optical system on the copying apparatus body 100 side is operated on the basis of the stop signal of the whole surface belt 27 and the exposure and copying process is executed for the sixth page of the original P/3\ set on the platen glass 10. The copying mode in this case is determined by the symbol marked on the partition paper sheet 300C as previously described, and copying is executed in accordance with that mode.

In this case, treatment of the aggregation of originals D3 is both-side original→one-side copying. In the case of both-side→one-side mode, the image of the original P/3\ is formed on the first surface of a copy sheet, and the copy sheet is discharged onto the copy tray 400 with the image bearing surface thereof facing upward (FIG. 9(19)).

(xi) The copying process of paragraph C-x is repeated a number of times corresponding to the desired number of sheets. The designation of this number of sheets is also based on the information from the partition paper sheet 300C.

(xii) Subsequently, the whole surface belt 27 is changed over to the reverse rotation on the basis of the exposure process completion signal of the copying apparatus 100 side for the sixth page of the original P/3\ (FIG. 9(20)).

(xiii) Then, the operations of paragraphs C-iv to C-vi are effected and the original P/3\ is set on the platen glass 10 with the fifth page thereof facing downward (FIG. 9(21)).

(xiv) Subsequently, the optical system on the copying apparatus body 100 side is operated on the basis of the stop signal of the whole surface belt 27 and the exposure and copying process is executed for the fifth page of the original set on the platen glass 10. In the same manner as described in paragraph C-x, the fifth page is copied on the first surface of a copy sheet, and the copy sheet is discharged onto the copy tray 400 with the image bearing surface thereof facing upward (FIG. 9(21)).

(xv) The copying process of paragraph C-x is repeated a number of times corresponding to the desired number of sheets.

(xvi) Then, the whole surface belt 27 is changed over to the reverse rotation on the basis of the exposure process completion signal of the copying apparatus 100 side for the original P △ (FIG. 9(22))

(xvii) By the operations of paragraphs A-ix to A-xiii, the original P △ is discharged with the fifth page thereof facing upward (FIG. 9(22)).

(xviii) The operations of paragraphs C-iii to C-xvii are repeated, whereby treatment of the aggregation of originals D3 is completed (FIGS. 9(23)–9(28)).

D. Treatment of Aggregation of Both-Side Originals D4

(i) When the discharge of the last original P △ of the aggregation D3 is completed, the operations of paragraphs A-ii to A-viii are effected and the partition paper sheet 300D is set on the platen At this time, the copying operation is not effected because the set partition paper sheet is not an original. The mode so far set by the partition paper sheet 300C is reset, whereupon a new mode by the partition paper sheet 300D is set and the following treatment for the originals is effected in this mode (FIG. 9(29)).

(ii) The operations of paragraphs A-ix to A-xiii are effected for the partition paper sheet 300D as for the partition paper sheets 300A–300C, and the partition paper sheet 300D is discharged.

(iii) By the operations of paragraphs C-iii to C-ix, the original P ③ is set on the platen glass 10 with the sixth page thereof facing downward (FIG. 9(30)).

(iv) Then, the optical system on the copying apparatus body 100 side is operated on the basis of the stop signal of the whole surface belt 27 and the exposure and copying process is executed for the sixth page of the original P ③ set on the platen glass 10. The copying mode in this case is determined by the symbol marked on the partition paper sheet 300D as previously described, and copying is executed in accordance with that mode (FIG. 9(30)).

(v) In this case, the treatment of the aggregation of originals D4 is both-side originals→both-side copying.

In the case of both-side→both-side mode, the image of the sixth page of the original P ③ is formed on the first surface of a copy sheet, and the copy sheet is temporarily fed to the re-conveying mechanism in the copying apparatus (FIG. 9(30)).

(vi) The copying process of paragraph D-v is repeated a number of times corresponding to the desired number of sheets. The designation of this number of sheets is also based on the information from the partition paper sheet 300D.

(vii) The operations of paragraphs C-xii to C-xiii are effected, and the original P ③ set on the platen glass 10 with the fifth page thereof facing downward (FIG. 9(31)).

(viii) Then the optical system on the copying apparatus body 100 side is operated on the basis of the stop signal of the whole surface belt 27, and the exposure and copying process is executed for the fifth page of the original P ③ set on the platen glass 10 (FIG. 9(31)).

A copy sheet on the first surface of which the image of the sixth page has already been formed is fed by the re-conveying mechanism, and the image of the fifth page is formed on the second surface of said copy sheet, whereby a both-side copy is formed, and the both-side copy is discharged onto the copy tray 400 with the fifth page surface thereof facing upward (FIG. 9(31)).

(ix) Thereafter, the operations of paragraphs D-iii to D-viii are repeatedly effected for the original P ② (the third and fourth pages) and the original P ① (the first and second pages), whereby treatment of the aggregation of originals D4 is completed (FIGS. 9(32) and 9(33)).

When the treatment of all the aggregations of originals in thus completed, the absence of originals on the supporting tray is detected by the first sensor S1 and the treatment is completed.

The originals after being treated are discharged onto the paper discharge tray 200, and the order of pages thereof is the same as the order of pages when the orginals have been set and thus, the trouble of page arrangement can be saved.

Further, the copy sheets are also discharged onto the tray 400 in the same order of pages as the order of pages of the set originals and therefore, the work after that can be done very efficiently.

In the illustration of the operation of an embodiment of the present invention (FIGS. 9(1)–9(33)), the number of copy sheets is described as one for an original, but a number of copy sheets will also do.

In that case, the use of a sorter page arranging machine which is a conventional apparatus will lead to further improved efficiency. That is, assuming that three copies each are desired for every treatment, the first to third bins (501–503) of the sorter may be used for the copy sheets for the aggregation of originals D1, the fourth to sixth bins (504–506) of the sorter may be used for the aggregation of originals D2, the seventh to ninth bins (507–509) of the sorter may be used for the aggregation of originals D3, and the tenth to twelfth bins (610–612) of the sorter may be used for the aggregation of originals D4.

Also, in the present embodiment, the fourth sheet path (h) is provided as the path for both-side originals; it will be apparent that if this path is omitted, there will more simply be provided an original feeding device for one-side originals.

Figure 12:
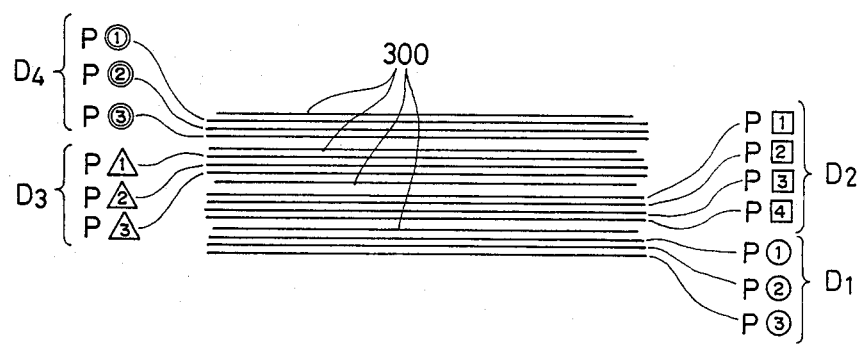
FIG. 12 is a cross-sectional view showing the supported state of originals.

Further, in the present embodiment, the partition paper sheets 300 are used to set the copying modes of the aggregations of originals to be treated thereafter, but alternatively; the copying modes may be set by the operation of the keys or the like of the operating portion (not shown) of the copying apparatus body 100, and the partition paper sheets 300 may be indicative of only the partitions between the aggregations of originals (FIG. 12). If the partition paper sheets are thoroughly used like the covers of the aggregations of originals, misuse thereof will be readily prevented.

Figure 11:
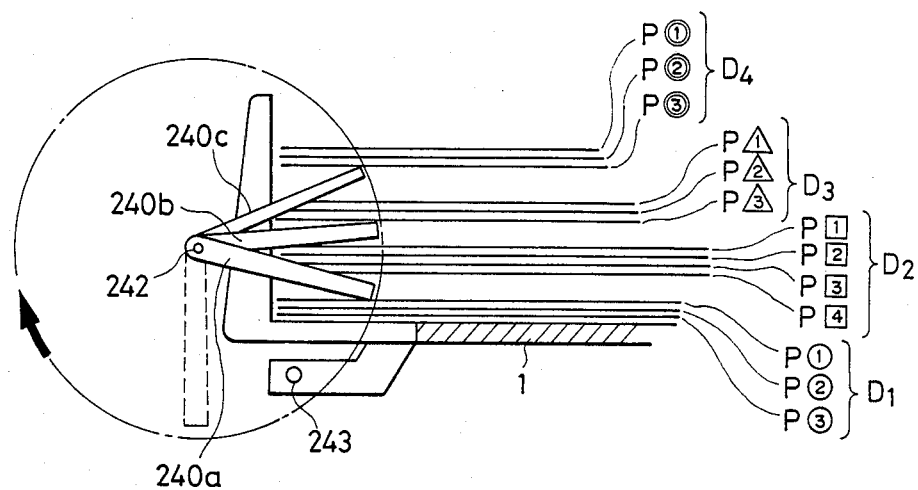
FIG. 11 illustrates a lever portion.

Furthermore, instead of the partition paper sheets 300 and the sensor S2, a sensor and levers as shown in FIG. 11 may be used to detect the partitions between the aggregations of originals.

Such case will hereinafter be described with reference to FIG. 11.

A plurality of levers 240 are pivotally mounted on a lever shaft 242 disposed on the inner side wall of the supporting tray 1. For convenience of description it is to be understood that three levers 240a–240c are used. These levers 240 normally depend downwardly as indicated by a broken line. A sensor 243 protruding into the plane of rotation of the levers is secured to the underside of the tray 1.

The operation of the levers 240 will hereinafter be described.

(i) As shown in FIG. 11, the case where the same aggregations of originals as those previously described are set on the tray 1 will be considered. The copying modes for the respective aggregations of originals D1–D4 are preset by the keys or the like of the operating portion (not shown) of the apparatus body 100. The aggregations of originals D1–D4 are set with the levers 240a–240c inserted therebetween.

(ii) When a start button (not shown) is depressed, the treatments of the aforementioned paragraphs A-xiv to A-xix are effected for the aggregation of originals D1. When the last original P① of the aggregation D1 is fed, the lever 240a loses its downward support and comes to depend downwardly as indicated by the broken line shown in FIG. 11. At this time, the lever 240a crosses the optical path of the sensor 243, whereby the completion of the feeding of the first aggregation of originals D1 is detected.

(iii) When the copying of the original P① is completed, the copying mode is changed over to the copying mode preset for the second aggregation of originals D2. The treatment for the aggregation D2 is then effected.

Likewise, the partition between the aggregations D2 and D3 is detected by the downward depending of the lever 240b, and the partition between the aggregations D3 and D4 is detected by the downward depending of the lever 240c and the preset modes are successively changed over and treatments are effected. Where it is desired to add an aggregation of originals D5 in a different mode during the execution of the treatments, if the already downwardly depending lever 240a is first rotated in the direction of arrow so as to ride onto the aggregation D4 and then the aggregation D5 is placed thereon and a mode is input from the operating portion, it will be possible to set the originals without waiting for the termination of the treatment even if the apparatus body is executing the treatment. That is, reservation is possible.

Figure 13:
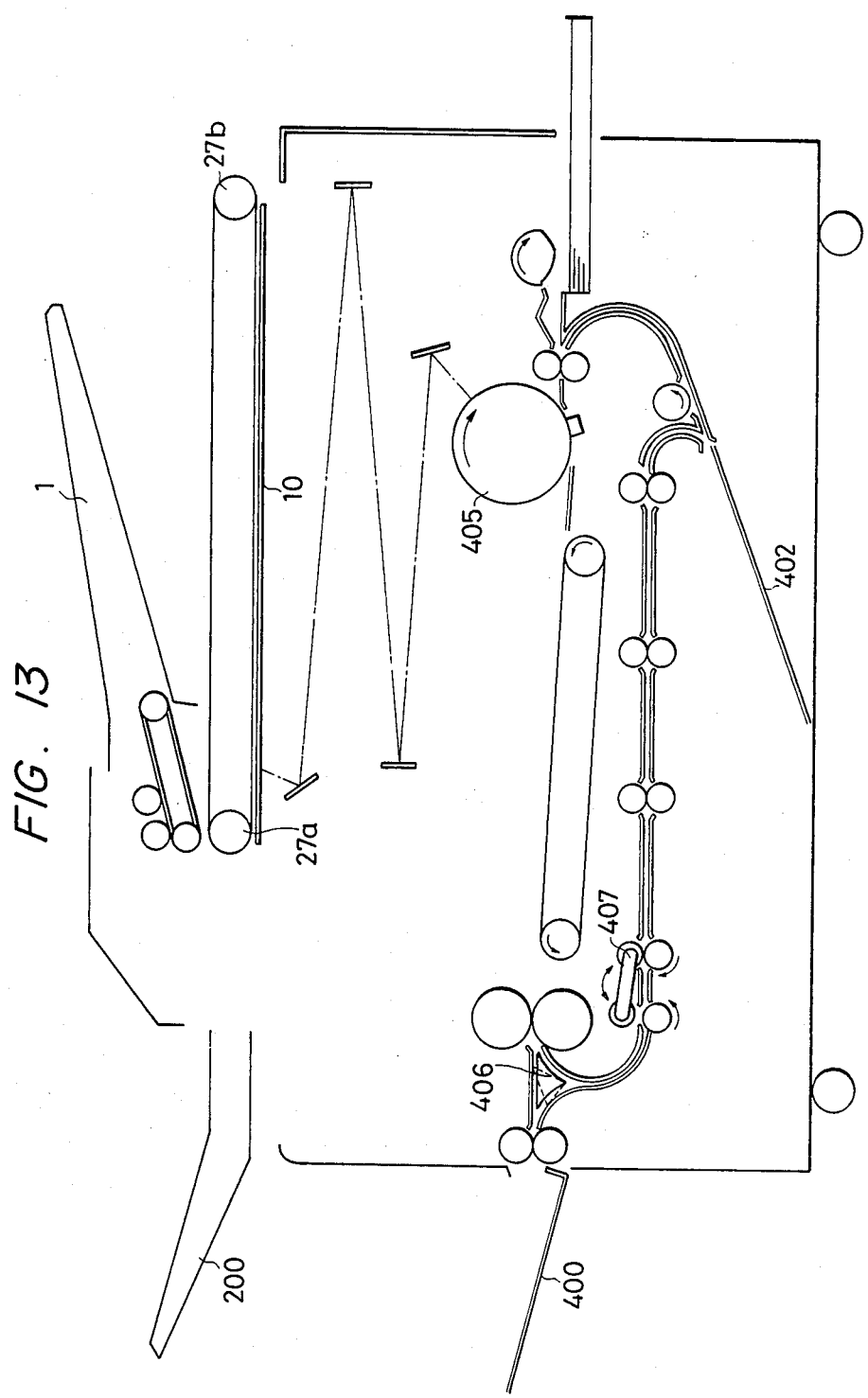
FIG. 13 schematically shows the conveyance path of a copy sheet.

FIG. 13 schematically shows the conveyance path of the copy sheet. In FIG. 13, reference numeral 402 designates an intermediate tray, reference numeral 405 denotes a photosensitive drum, reference numeral 406 designates a change-over deflector, and reference numeral 407 denotes switch-back means. The copy sheet on the first surface of which copying has been effected by the photosensitive drum 405 passes through the deflector 406 and along the intermediate tray 402 and is reversed, and copying is again effected on the other surface of the copy sheet by the photosensitive drum 405, whereafter the copy sheet is discharged onto the tray 400.

Figure 14A:
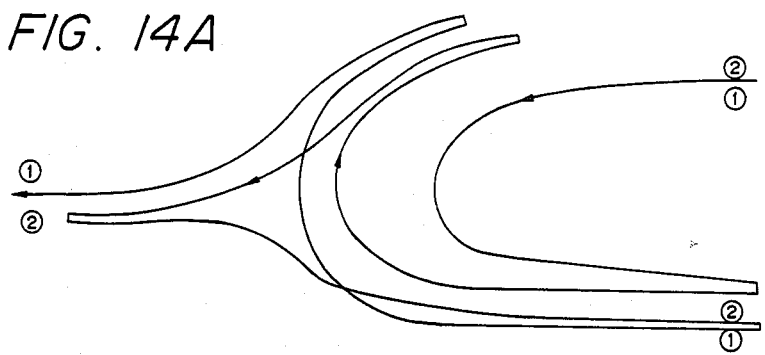
FIG. 14A shows the conveyance route of originals when both-side copying is effected from both-side originals.
Figure 14B:
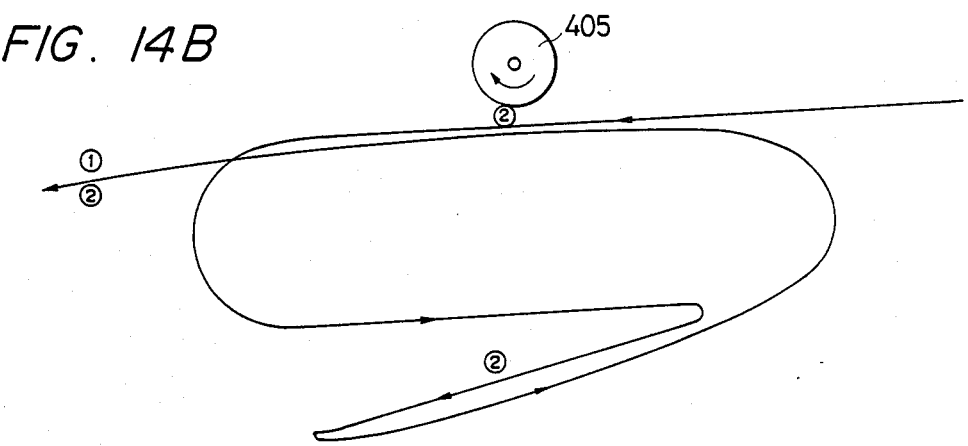
FIG. 14B shows the route of a copy sheet in a similar case.
Figure 14C:
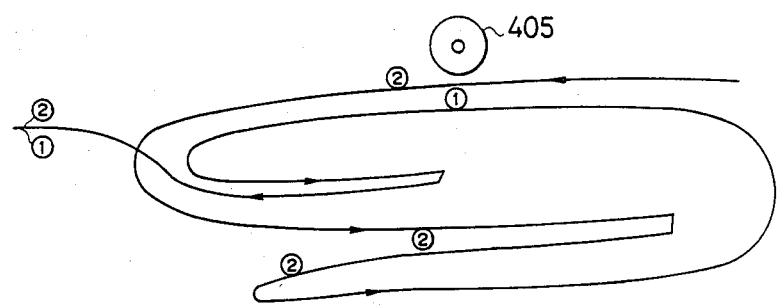
FIG. 14C shows another route of the copy sheet in a similar case.

FIGS. 14A and 14B show the order of conveyance of an original and the course of the copy sheet corresponding thereto. The page ② is first exposed and copied, whereafter the page ① is exposed and copied on the back surface of the copy sheet. In FIG. 14C, the pages ② and ① are copied in the named order, and then the original is reversed and discharged.

Figure 15A:
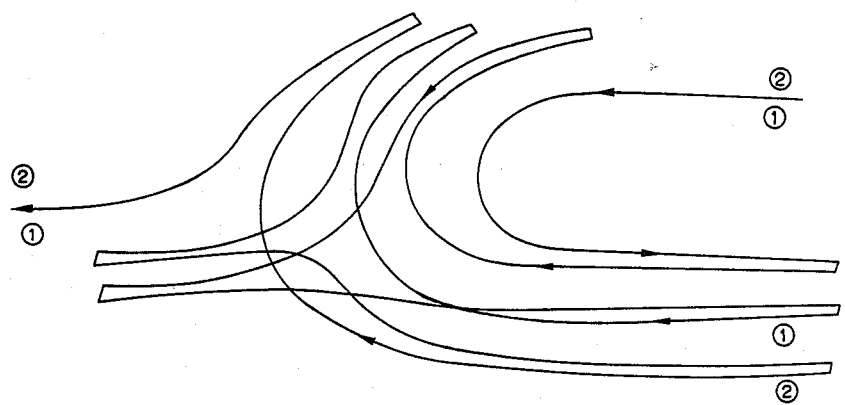
FIG. 15A shows another route of originals in a similar case.
Figure 15B:
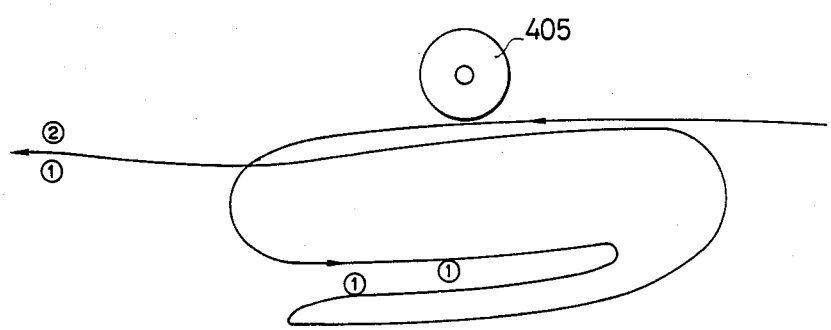
FIG. 15B shows the route of the copy sheet in a similar case.

In FIGS. 15A and 15B, the original is idly fed and the page ① is first exposed and copied, whereafter the page ② is exposed and copied. That is, the page ② first arrives at the platen, but at this time, exposure is not effected.

We claim:

1. An original feeding device comprising:
supporting means for supporting originals thereon;
feed means for feeding the supported originals one by one in order from the bottom to the top;
means for forming a sheet path of downward convexd shape for reversing the originals from said feed means and directing the originals to the entrance of an original treating station;
reversible conveying means for conveying the originals from the entrance of said original treating station to said original treating station, and discharging the originals from the original treating station by reverse rotation;
means for forming a reversing path of upward convey shape for reversing the originals discharged from said original treating station and directing the originals substantially upwardly;
means for forming a path branching off from said reversing path in a switch-back direction; and
original receiving means for receiving the discharged originals.

2. An orignal feeding device according to claim 1, further comprising change-over means for detecting the partition between a plurality of aggregations of originals supported on said supporting means and producing a copying mode change-over signal.

3. An original feeding device according to claim 1, wherein said change-over means has means provided in said sheet path to detect a partition sheet inserted in each partition between the aggregations of originals and fed with the originals.

4. An original feeding device comprising:
supporting means for supporting originals thereon;
feed means for feeding the supported originals one by one;
means for forming a sheet path for reversing the originals from said feed means and directing the originals to the entrance of an original treating station;
reversible conveying means for conveying the originals from the entrance of said original treating station to said original treating station;
means for forming a switch-back path for directing the originals while reversing the direction of conveyance of the originals discahrged from said original treating station by the reversal of said conveying means, wherein said switch-back path comprises:
means for forming a reversing path for reversing the originals discharged from said original treating, station and directing the originals substantially upwardly;
means for forming a path branching off from said reversing path in a switch-back direction; and
a reversible roller; and
original receiving means for receiving the originals discharged from said original treating station while being reversed through said switch-back path.

5. An original feeding device comprising:
supporting means for supporting originals thereon;
feed means for feeding the supported originals one by one in order from the bottom to the top;
means for forming a first sheet path of downward convex shape for reversing the originals from said feed means and directing the originals to the entrance of an originals treating station;
reversible conveying means for conveying the originals from the entrance of said original treating station to sadi original treating station, and discharging the originals from said original treating station by reverse rotation;

means for forming a reversing path of upward convey shape for reversing the originals discharged from said original treating station and directing the originals substnatially upwardly;

means for forming a path branching off from said reversing path in a switch-back direction;

original receiving means for receiving the originals discharged from said original treating station while being reversed through said branching path; and means for forming a second sheet path branching off from said branching path in a switch-back direction and directing the originals to the entrance of said original treating station.

6. An original feeding device according to claim 5, further having change-over means for detecting the partition between a plurality of aggregations of originals supported on said supporting means and producing a copying mode change-over signal.

7. An original feeding device according to claim 6, wherein said change-over means has means provided in said sheet paths and inserted in each partition between aggregations of originals to detect a partition sheet fed with the orignals.

8. An original feeding device according to claim 5, further comprsiing a plurality of reversible rollers provided at the junctions of the first path and the branching path, of the branching path and the second path and of the second path and the first path.

9. An original feeding device comprising:
supporting means for supporting originals thereon;
feed means for feeding the supported originals one by one;
means for forming a first sheet path for reversing the originals from said feed means and directing the originals to the entrance of an original treating station;
reversible conveying means for conveying the originals from the entrance of said original treating station to said original treating station;
a switch-back path for directing the originals while reversing the dirction of conveyance of the originals discharged from said original treating station by the reversal of said conveying means;
original receiving means for receiving the originals discharged while being reversed through said switch-back path;
means for forming a second sheet path branching off from said switch-back path in a switch-back direction and directing the originals to said original treating station; and
change-over means for detecting the partition between a plurality of aggregations of originals supported on said supporting means and producing a copying mode change-over signal, wherein said change-over means comprises lever means provided on said supporting means and inserted in each partition between aggregations of originals supported on said supporting means.

10. An original feeding device comprising:
supporting means for supporting originals thereon;
feed means for feeding the supported originals one by one;

means for forming a first sheet path for reversing the originals from said feed means and directing the originals to the entrance of an original treating station;
reversible conveying means for conveying the originals from the entrance of said original treating station to said original treating station;
means for forming a switch-back path for directing the originals while reversing the direction of conveyance of the originals discharged from said original treating station by the reversal of said conveying means, wherein said switch-back path comprises:
means for forming a reversing path for reversing the originals discharged from said original treating station and directing the originals subtantially upwardly;
means for forming a path branching off from said reversing path in a switch-back direction; and
a reversible roller;
original receiving means for receiving the originals discharged from said original treating station while being reversed through said switch-back path; and
means for forming a second sheet path branching off from said switch-back path in a switch-back direction and directing the originals to said original treating station.

11. An original feeding device comprising:
supporting measn for supporting both-side originals thereon with the first pages thereof facing upward;
feed means for feeding the supported originals one by one in order from the bottom to the top;
means for forming a first sheet path of downward convex shape for reversing the originals from said feed means and direcitng the originals to the entrance of an original treating station;
reversible conveying means for conveying the originals from the entrance of said original treating station to said original treating station, and discharging the originals from said original treating station by reverse rotation;
means for forming a reversing path of upward convey shape for reversing the originals discahrged from said original treating station and directing the originals substantially upwardly;
means for forming a path branching off from said reversing path in a switch-back direction;
original receiving means for receiving the originals discharged from said original treating station while being reversed through said branching path; and
means for forming a second sheet path branching off from said reversing path in a switch-back direction and directing the reversed originals to said original treating station without returning the originals to said orignal receiving means.

12. An original feeding device according to claim 11, further having change-over means for detecting the partition between a plurality of aggregations of originals supported on said supporting means and producing a copying mode change-over signal.

13. An original feeding device according to claim 11, further comprising reversible rollers provided at the junctions of the first path and the branching path, of the branching path and the second path and of the second path and the first path.

* * * * *

UNITED STATES PATENT AND TRADEMARK OFFICE
CERTIFICATE OF CORRECTION

PATENT NO. : 4,769,674

DATED : September 6, 1988

INVENTOR(S) : TADAYUKI KITAJIMA, ET AL.

It is certified that error appears in the above-identified patent and that said Letters Patent is hereby corrected as shown below:

COLUMN 1, line 9, "portion" should read --portion,--;

line 27, "aggragations" should read --aggregations--.

COLUMN 3, line 6, "is" should read --are--;

line 40, "and" (first occurrence) should be deleted;

line 43, "and" (first occurrence) should be deleted.

COLUMN 4, line 18, "10 S4" should read --10, S4--;

line 64, "hole" should read --whole--.

COLUMN 5, line 10, "as" should read --a--;

line 58, "parking" should read --marking--.

COLUMN 6, line 1, "making" should read --marking--;

line 43, "weight member D40: should read --weight member 40--.

COLUMN 7, line 26, "this," should read --this--.

UNITED STATES PATENT AND TRADEMARK OFFICE
CERTIFICATE OF CORRECTION

PATENT NO. : 4,769,674

DATED : September 6, 1988

INVENTOR(S) : TADAYUKI KITAJIMA, ET AL.

It is certified that error appears in the above-identified patent and that said Letters Patent is hereby corrected as shown below:

COLUMN 8, line 37, "A- Viii" should read --A-viii--;

line 58, "belt 7," should read --belt 27,--.

COLUMN 9, line 25, "formed." should read --formed--;

line 55, "P△" should read --P△--;

line 62, "elapsed" should read --elapsed,--; same line, "$" should be deleted;

line 63, "original △" should read --original P △--.

COLUMN 10, line 3, "path h." should read --path (h).--;

line 10, "h is" should read --(h) is--.

COLUMN 11, line 56, "P ③ set" should read --P ③ is set--.

COLUMN 12, line 15, "orgin-" should read --origin--;

line 39, "path (h)" should read --path (h)--.

COLUMN 14, line 5, "vexd" should read --vex--;

line 21, "orignal" should read --original--;

line 26, "claim 1," should read --claim 2,--;

line 44, "discahrged" should read --discharged--;

UNITED STATES PATENT AND TRADEMARK OFFICE
CERTIFICATE OF CORRECTION

PATENT NO. : 4,769,674

DATED : September 6, 1988

INVENTOR(S) : TADAYUKI KITAJIMA, ET AL.

It is certified that error appears in the above-identified patent and that said Letters Patent is hereby corrected as shown below:

COLUMN 14, line 50, "ing," should read --ing--;

line 65, "originals" should read --original--;

line 68, "sadi" should read --said--.

COLUMN 15, line 6, "substnatially" should read --substantially--;

line 25, "orignals." should read --originals.--;

line 27, "comprsiing" should read --comprising--;

line 44, "dirction" should read --direction--.

COLUMN 16, line 16, "subtan-" should read --substan- --;

line 29, "measn" should read --means--;

line 35, "direcitng" should read --directing--;

line 43, "discahrged" should read --discharged--;

UNITED STATES PATENT AND TRADEMARK OFFICE
CERTIFICATE OF CORRECTION

PATENT NO. : 4,769,674

DATED : September 6, 1988

INVENTOR(S) : TADAYUKI KITAJIMA, ET AL.

It is certified that error appears in the above-identified patent and that said Letters Patent is hereby corrected as shown below:

COLUMN 16, line 55, "orignal" should read --original--.

Signed and Sealed this

Twenty-sixth Day of September, 1989

Attest:

DONALD J. QUIGG

Attesting Officer

Commissioner of Patents and Trademarks